3,291,813
3 MONO AND 3,16-DIESTERS OF Δ⁵-ANDROSTENE-
3β,16α-DIOL-17 ONE AND PROCESS FOR THE
PRODUCTION THEREOF
Allan Eugene Hydorn, Milltown, and James Riva Moetz,
New Brunswick, N.J., assignors, by mesne assignments,
to E. R. Squibb & Sons, Inc., New York, N.Y., a corporation of Delaware
No Drawing. Filed Aug. 19, 1964, Ser. No. 390,723
8 Claims. (Cl. 260—397.4)

This invention relates to a new method for preparing steroids and to certain new steroids prepared thereby; and, more particularly, to the preparation of new 3-monoesters and certain new 3,16-diesters of Δ⁵-androstene-3β,16α-diol-17-one from diesters of Δ⁵,¹⁶-androstadiene-β,17-diol.

The process of this invention can be represented by the following equations, wherein R is an acyl group, preferably of a hydrocarbon carboxylic or dicarboxylic acid of less than twelve carbon atoms and R' is the acyl group of a hydrocarbon dicarboxylic acid of less than twelve carbon atoms (e.g., malonic, succinic, glutaric, and maleic acid) or a salt thereof, such as a salt with an alkali metal hydroxide, alkaline earth metal hydroxide and amine:

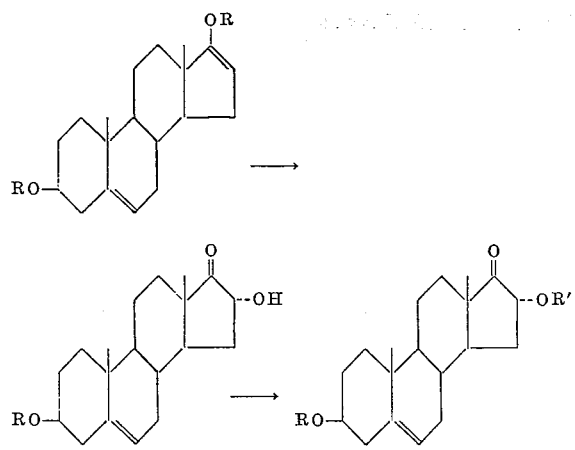

To prepare the compounds of this invention, a diester of Δ⁵,¹⁶-androstadiene-3β,17-diol, wherein the esterifying groups can be the same or different and preferably are acyl groups of hydrocarbon carboxylic or dicarboxylic acids of less than twelve carbon atoms, as exemplified by one of the alkane dicarboxylic acids mentioned hereinbefore, or a monocarboxylic acid such as the lower alkanoic acids (e.g., acetic, propionic, butyric, pentanoic, hexanoic, and octanoic acid), the lower alkenoic acids, the monocyclic aryl carboxylic acids (e.g., benzoic and o, m, and p-toluic acids), the monocyclic ar(lower alkanoic) acids (e.g., phenacetic and β-phenylpropionic acid), the monocyclic cycloalkane carboxylic acids, and the monocyclic cycloalkene carboxylic acids, is treated with a permanganate, such as an alkali metal permanganate (e.g., potassium permanganate) and dilute formic acid (such as 10% aqueous formic acid), preferably in the presence of an organic solvent, such as acetone, for the steroid reactant. The reaction surprisingly selectively oxidizes the 16,17-double bond to a glycol which undergoes immediate elimination of the unstable 17-hemiacylal to give the 16α-hydroxy-17-one, thereby yielding the new 3-monoesters of Δ⁵-androstene-3β,16α-diol-17-one of this invention.

These new 3-monoesters can, if desired, be further acylated, as by treatment with an acyl chloride or acid anhydride of one of the hydrocarbon dicarboxylic acids mentioned hereinbefore, preferably in the presence of a tertiary base, such as pyridine, to yield the new diesters of this invention; or can be hydrolyzed, as by treatment with methanolic sulfuric acid, to yield the known Δ⁵-androstene-3β,16α-diol-17-one. The hemiesters thus formed can then be neutralized in the usual manner to yield the salts of this invention.

In addition to their use as intermediates, the new compounds of this invention are physiologically active substances, which have androgenic activity and hence can be administered in the same manner as and in lieu of known androgens, such as testosterone, for the treatment of conditions responding to androgenic agents.

The following examples illustrate the invention (all temperatures being in centigrade):

Example 1.—Δ⁵-androstene-3β,16α-diol-17-one 3-acetate 2 g. of Δ⁵,¹⁶-androstadiene-3β,17-diol 3,17-diacetate (prepared by reacting 10 g. of Δ⁵-androstene-3β-ol-17-one acetate with 200 ml. of isopropenyl acetate and 1.5 g. of p-toluenesulfonic acid) in 60 ml. of acetone containing 3.3 ml. of 10% aqueous formic acid is mixed with a solution of 1.75 g. of potassium permanganate in 30 ml. of water diluted to 58.4 ml. with acetone. The mixture is held at 25–30° for 1.5 hours to give about 0.48 g. of pure Δ⁵-androstene-3β,16α-diol-17-one 3-acetate, M.P. about 163–164°.

Similarly, if other 3,17-diesters are used in lieu of the diacetate as starting materials in the procedure of Example 1 the corresponding 3-monoesters of Δ⁵-androstene-3β,16α-diol-17-one are obtained. Thus, the 3,17-dipropionate and 3,17-dibenzoate of Δ⁵,¹⁶-androstadiene-3β,17-diol yield the 3-propionate and 3-benzoate of Δ⁵-androstene-3β,16α-diol-17-one, respectively.

Example 2.—Δ⁵-androstene-3β,16α-diol-17-one

A solution of 100 mg. of Δ⁵-androstene-3β,16α-diol-17-one 3-acetate in 15 ml. of methanol is treated with 7 ml. of 6 N sulfuric acid and allowed to stand at room temperature for about 3 days. The solution is extracted with 100 ml. of ethyl acetate, the organic layer washed with water, 7% aqueous sodium bicarbonate solution, and again with water, then concentrated to a residue. The crude solid is recrystallized from methanol to give about 40 mg. of Δ⁵-androstene-3β,16α-diol-17-one, M.P. about 180–183°.

Example 3.—Δ⁵-androstene-3β,16α-diol-17-one
3-acetate, 16-hemisuccinate

A solution of 100 mg. of Δ⁵-androstene-3β,16α-diol-17-one 3-acetate and 0.4 g. of succinic anhydride in 4 ml. of dry pyridine is allowed to stand at room temperature for about 36 hours. The solution is diluted with about 40 ml. of water and made acidic by adding a sufficient quantity of 6 N sulfuric acid. The solid that separates is filtered and recrystallized from 95% ethanol to give about 30 mg. of Δ⁵-androstene-3β,16α-diol-17-one 3-acetate, 16-hemisuccinate, M.P. about 138–141°.

Example 4.—Δ⁵-androstene-3β,16α-diol-17-one
3-acetate, 16-hemisuccinate sodium salt 4.5 mg. of Δ⁵-androstene-3β,16α-diol-17-one 3-acetate, 16-hemisuccinate is dissolved in 0.02 ml. of 10% aqueous sodium carbonate solution and 0.18 ml. of warm water to give an approximately 2% aqueous solution of the sodium salt of Δ⁵-androstene-3β,16α-diol-17-one 3-acetate, 16-hemisuccinate.

The invention may be variously otherwise embodied within the scope of the appended claims.

What is claimed is:
1. A steroid of the formula

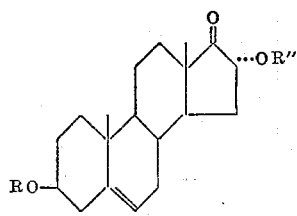

wherein R is selected from the group consisting of the acyl radical of a hydrocarbon carboxylic acid of less than twelve carbon atoms, a hydrocarbon dicarboxylic acid of less than twelve carbon atoms, and alkali metal, alkaline earth metal or amine salts of the latter; and R" is selected from the group consisting of hydrogen, the acyl radical of a hydrocarbon dicarboxylic acid of less than twelve carbon atoms and salts thereof.

2. $\Delta^5$-androstene-3$\beta$,16$\alpha$-diol-17-one 3-acetate.
3. $\Delta^5$-androstene-3$\beta$,16$\alpha$-diol-17-one 3-acetate, 16-hemisuccinate.
4. The sodium salt of $\Delta^5$-androstene-3$\beta$,16$\alpha$-diol-17-one 3-acetate, 16-hemisuccinate.
5. A process for preparing the 3-monoesters of $\Delta^5$-androstene-3$\beta$,16$\alpha$-diol-17-one, which comprises reacting a 3,17-diester of $\Delta^{5,16}$-androstadiene-3$\beta$,17-diol with an alkali metal permanganate and dilute formic acid.

6. A process for preparing $\Delta^5$-androstene-3$\beta$,16$\alpha$-diol-17-one 3-acetate, which comprises reacting $\Delta^{5,16}$-androstadiene-3$\beta$,17-diol diacetate with an alkali metal permanganate and dilute formic acid.
7. The process of claim 5 wherein the alkali metal permanganate is potassium permanganate and 10% aqueous formic acid is used.
8. A steroid of the formula

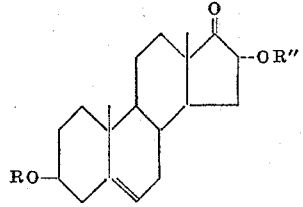

wherein R is the acyl radical of a hydrocarbon carboxylic acid of less than twelve carbon atoms, and R" is the acyl radical of a hydrocarbon dicarboxylic acid of less than twelve carbon atoms or a salt thereof.

References Cited by the Examiner

Aoki et al.: Chem. & Pharm. Bull., Japan, vol. 12, July 1964.
Fieser et al.: "Steroids," 1959, Reinhold Publishing Corp., New York, pages 527–528 relied on.

LEWIS GOTTS, *Primary Examiner.*
E. L. ROBERTS, *Examiner.*